United States Patent [19]
Alexander

[11] Patent Number: 5,990,420
[45] Date of Patent: Nov. 23, 1999

[54] CABLE SECURING SYSTEM

[75] Inventor: Arthur Ray Alexander, Valley Center, Calif.

[73] Assignee: NCR Corporation, Dayton, Ohio

[21] Appl. No.: 08/989,315

[22] Filed: Dec. 12, 1997

[51] Int. Cl.⁶ .................................................. H01B 7/00
[52] U.S. Cl. ............................ 174/135; 174/157; 248/56
[58] Field of Search .................................. 174/135, 151, 174/157, 88 R, 88 S, 72 R, 84, 92; 248/56

[56] References Cited

U.S. PATENT DOCUMENTS

| | | | |
|---|---|---|---|
| 3,668,301 | 6/1972 | Faulconer | 174/88 R |
| 4,449,015 | 5/1984 | Hotchkiss et al. | 174/138 F |
| 4,719,321 | 1/1988 | Kozel et al. | 174/135 |
| 4,831,215 | 5/1989 | Clark et al. | 174/92 |
| 4,890,318 | 12/1989 | Crane et al. | 379/399 |
| 4,927,984 | 5/1990 | Meislitzer et al. | 174/92 |
| 5,241,136 | 8/1993 | Michaelis et al. | 174/151 |
| 5,254,808 | 10/1993 | Rodriques et al. | 174/65 R |
| 5,780,774 | 7/1998 | Ichikawa et al. | 174/88 R |
| 5,828,005 | 10/1998 | Huynh-Ba et al. | 174/92 |

*Primary Examiner*—Kristine Kincaid
*Assistant Examiner*—Dhiru R Patel
*Attorney, Agent, or Firm*—Gates & Cooper

[57] ABSTRACT

A device for securing multiple cables including a first comb member which has teeth and spaces. The spaces locate different multiple cables. A closure member can also be a comb with teeth and spaces. The two comb members are hinged on one side to open and close, so that the relative spaces are in alignment when closed. There is a securing member for securing the two combs together. Cables can remain in their relative spaces when the combs are opened or closed.

13 Claims, 3 Drawing Sheets

CABLE SECURING SYSTEM

BACKGROUND OF THE INVENTION

1. Field of the Invention

Having a device for effectively securing cables so that the transmission of electrical signals are subject to a reduced mechanical and/or electrical interference is highly desirable. This invention relates to a cable securing device for locating multiple cables. In particular the device is for securing the cables, whether the device is opened or closed.

2. Description of Related Art

The routing, supporting, and tracing cables used for transmission of electrical signals has become a formidable problem. The cables used in support of high data rates are more complex and larger than those used to support like technology at slower data rates. In many cases the width of the transmitted word has increased. For bandwidth reasons this also increases cable size and complexity. The mass of these cables can contribute to numerous problems. One problem that is easily recognized is the blockage of air flow. Some lesser known problems are sharp bends that can increase the error rate. When these assemblies are made with a foamed dielectric, they are intolerant of external forces impinging on the outer jacket. Service is difficult under a curtain of cables. Customers also complain about the untidy appearance of the cables.

There is, accordingly, a need to provide a device and system for securing cables in a manner which minimizes the current problems.

SUMMARY OF THE INVENTION

By this invention, there is provided a system for minimizing the difficulties of securing multiple cables in a system.

According to the invention, there is provided a device for securing multiple cables which includes a first elongated body member which has a series of teeth with respective spaces between the teeth. There is a mouth for each space, and one or more cables can fit into each space. Effectively, the body member has an elongated rectangular face and is essentially a comb-like structure. There is also provided a closure member to close the spaces of the comb member.

In a preferred form of the invention, the closure member is also a comb-like structure which has teeth and spaces, having a similar profile as the body member. The body member and closure member are hinged at one edge to be relatively opened and closed. At a different position, removed from the hinge location, the closure member can be secured with the body member.

In a preferred embodiment it is preferred to have a constricted throat leading to an oversize zone for maintaining one or more cables. The size of the restricted throat would be sufficient to pass a cable through the throat, while the oversize opening could locate one or more cables in the opening or cavity without the application of constant pressure.

In other preferred forms of the invention cables with dense dielectric can use a relatively simple tooth structure, namely a regular size between the throat and a cavity for the cables.

The invention is further described with reference to the accompanying drawings.

DETAILED DESCRIPTION OF THE INVENTION

Figure 1:
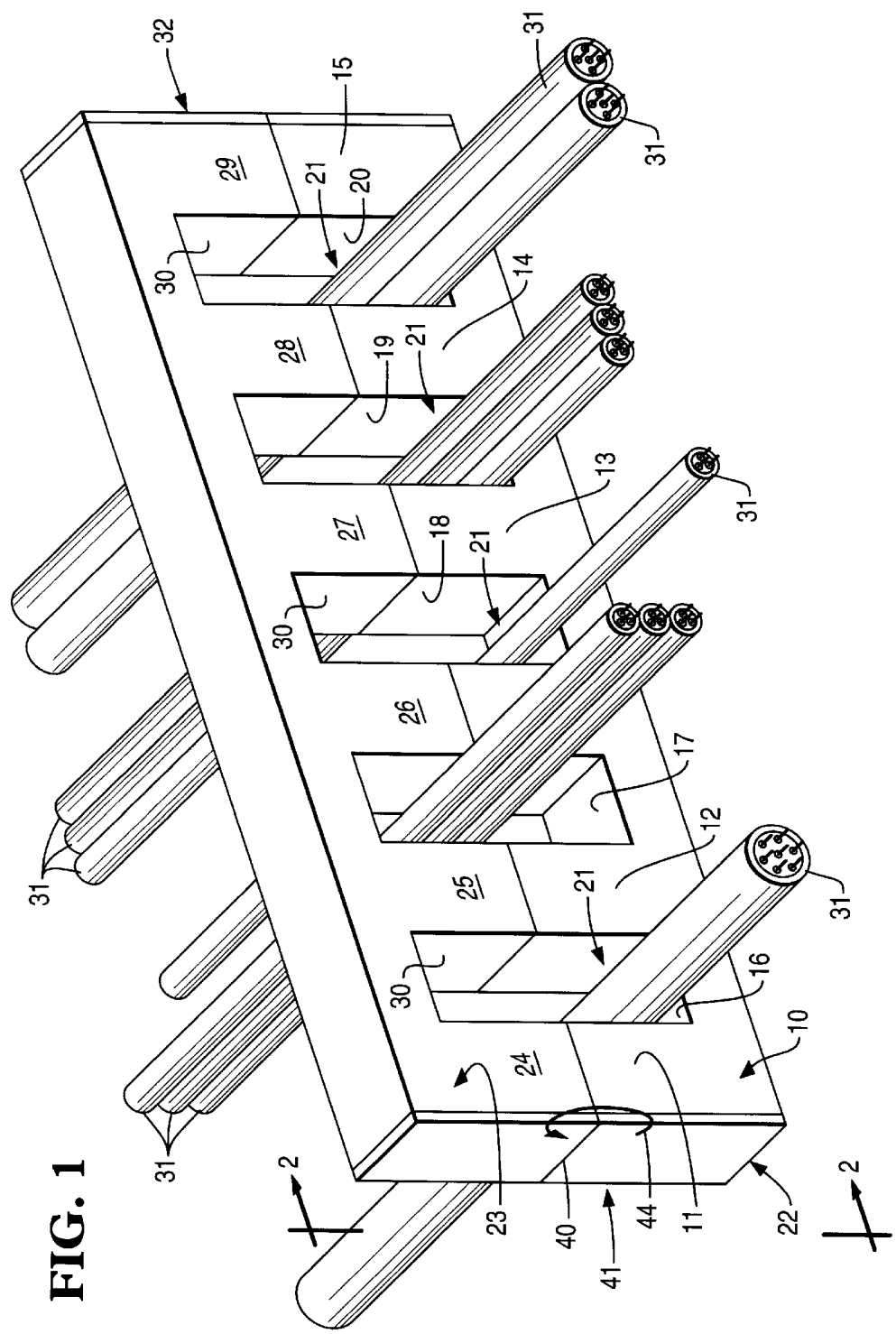
FIG. 1 is a perspective view showing a body member and a mating closure member with several cables running through the spaces in the two members.
Figure 2:
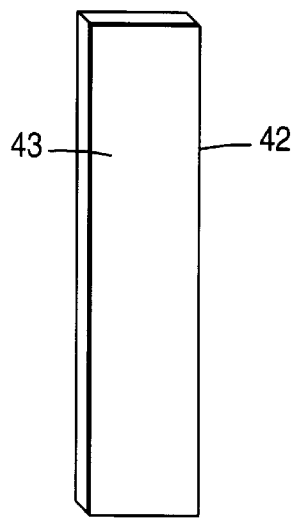
FIG. 2 is a perspective end view sharing the hinge member.

In FIG. 1 there is an elongated body member 10 which has a series of spaced apart teeth 11, 12, 13, 14 and 15. Between the teeth, there are a series of spaces 16, 17, 18, 19 and 20. The body member 10 essentially is a comb-type configuration having a substantially rectangular profile. Each of the respective spaces 16, 17, 18, 19 and 20 has a mouth area which is generally designated by numeral 21. Viewed from the front or rear, the body member 10 is essentially a rectangular configuration with spaces cut into the top edge into the rectangular configuration. Further, there is a depth 22 for the device which is substantially of the same width of the spaces between each of the teeth. Dimensions of the spaces and the teeth can change with respect to the outer diameter of the cables, the number of cables in the device and in each space and the bend radius of the cables.

There is also a closure member 23 which acts to close the respective mouths 21 for each of the spaces in the first body comb member 10. As illustrated, the closure member 23 includes teeth 24, 25, 26, 27, 28 and 29 respectively. Between each of these teeth there are a series of spaces collectively indicated by numeral 30. The spaces 30 in the closure member 23 align with the spaces 16, 17, 18, 19 and 20 in the body member 10. Each of the spaces 30 has a mouth, which aligns with the mouth 21 in the respective space obviously located in the body member 10. The closure member 23 essentially has a similar shape in respects as the body member 10, and they are in a mating relationship with each other as indicated.

In each of the spaces 16, 17, 18, 19 or 20 in the body member 10 and the spaces 30 in the closure member 23, one or more cables collectively indicated by numeral 31 can be located.

Figure 3:
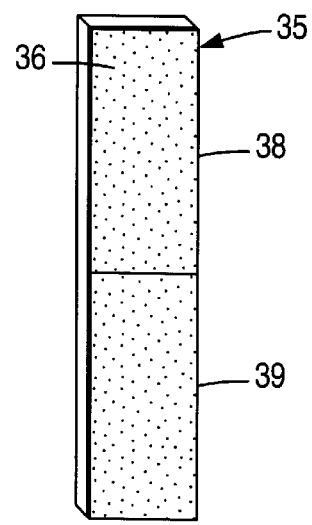
FIGS. 3 and 4 show respectively the two elements making up the closure member.
Figure 4:
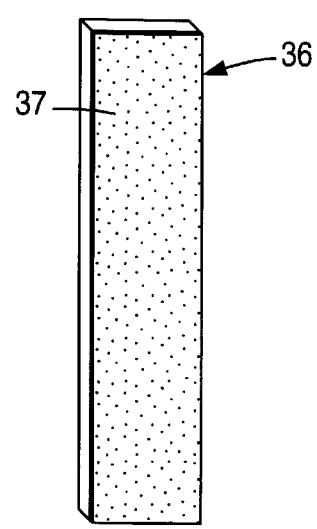

At the end 32 of the body member 10 and the closure member 23, there is a securing means which is shown in FIGS. 3 and 4. As illustrated, there are two tapes 35 and 36 which are part of a Velcro (TM), or a hook and loop mating formation. As shown, there are loop formations 36 on element 35, and hook formations 37 on element 36. Element 35 has two separate components 38 and 39, respectively. Component 38 is affixed to the end portion 32 of the closure member 23, and component 39 is affixed to the end portion 32 of the body member 10. The face of element 35 opposite the loop formations 36 is affectedly adhered to the end 32 of each of the body member 10 and the closure member 23. The hook formation member 36, when in engagement with components 38 and 39, effectively secures the body member 10 and closure member 23 in a secured closed position. Removal or separation of the hook member 36 from the loops 36 of at least one or either of portions 38 or 39 permits the separation of the body member 10 and the closure member 23 at the end 32.

The hinge formation 40 at the end 41 of the device is formed by a tape 42, which is flexible. A line 43 for a hinge is formed in the tape 42 so that the body member 10 and closure member 23 can rotate relatively as indicated by the arrow 44. The strip 42 is affectedly adhered to the end 41 of the body member 10 and closure member 23.

Figure 5:
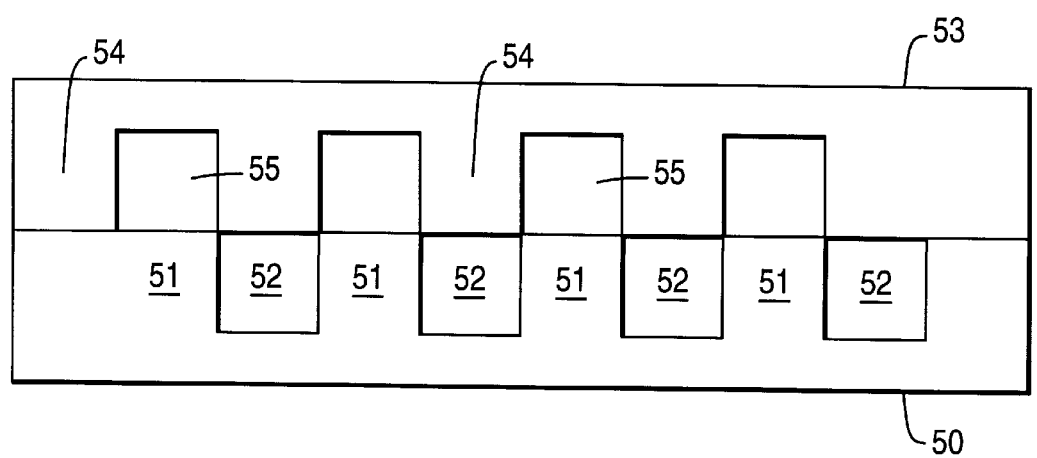
FIG. 5 is an alternative configuration of the cable securing device.

As illustrated in FIG. 5 there is a different embodiment. Here the first body member 50 has teeth 51 and spaces 52. The closure member 53 has teeth 54 and spaces 55. The teeth 51 and spaces 52 of the first member 50 are misaligned relative to the teeth 54 and spaces 55 of the closure member 53. This is a different configuration to the configuration illustrated in FIG. 1 where the relative spaces and teeth of the body member 10 and the closure member 23 are aligned.

This device can take many different forms dependent on the size and quantity of cables that need to be restrained. The body member and closure members can be molded with a hinge mechanism on one end and a method of retaining a closed position at the other end. These molded parts have spaces or cavities of the size and quantity for the subject cable or cables. These spaces or cavities might lightly squeeze on the cable to provide retention when the device is in an open position. A different device would provide a constricted opening to a cavity slightly larger than the subject cable, thereby enabling the cable to be more easily slid through the constriction in the larger section. The device can be opened for adding or removing cables while unaffected cables are retained in their assigned places.

A device of the invention retains cables when the device is in both an open or a closed position. This device can be mounted fast to a panel or wall routing the cables to a desired location.

In a preferred form of the invention the molded parts with the teeth and spacers and the latch and the hinge element are included in a single molding operation. Moreso, in different arrangements, the higher the frequency to be carried in each cable, the greater will be the preferred spacing between the teeth so as to minimize interference. Moreover, the size of the cable relative to the spaces and teeth are also dependent on the dielectric. The spacing is governed by the primary frequency of the signals being carried in the cable.

Figure 6:
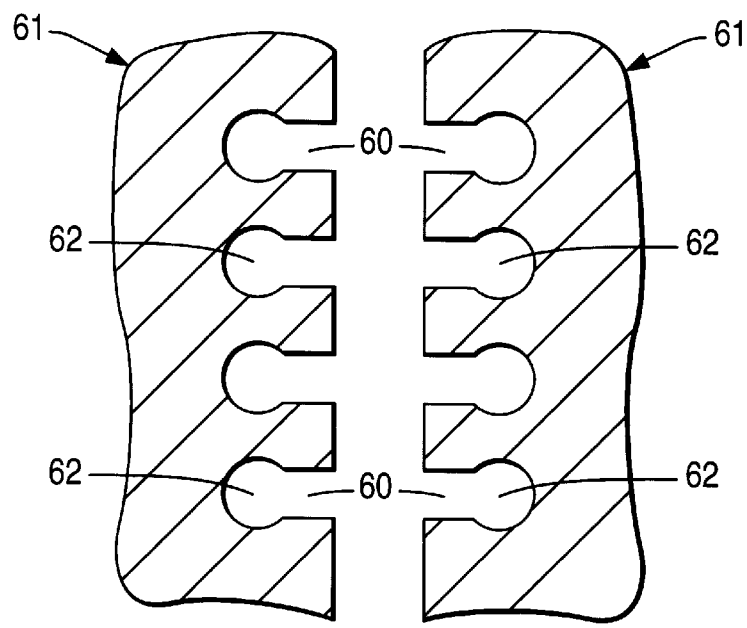
FIG. 6 is a partial side view showing two elongated members in abutting relationship to each other, with a restrictive throat and a larger size opening for housing the cables.

As illustrated in FIG. 6 there is an arrangement where there is a throat section 60 for each element 61. Each throat is sized so that a cable can fit through the throat. Beyond each throat there is a cavity or opening 62 which is of larger size than the width of the throat 60.

Figure 7:
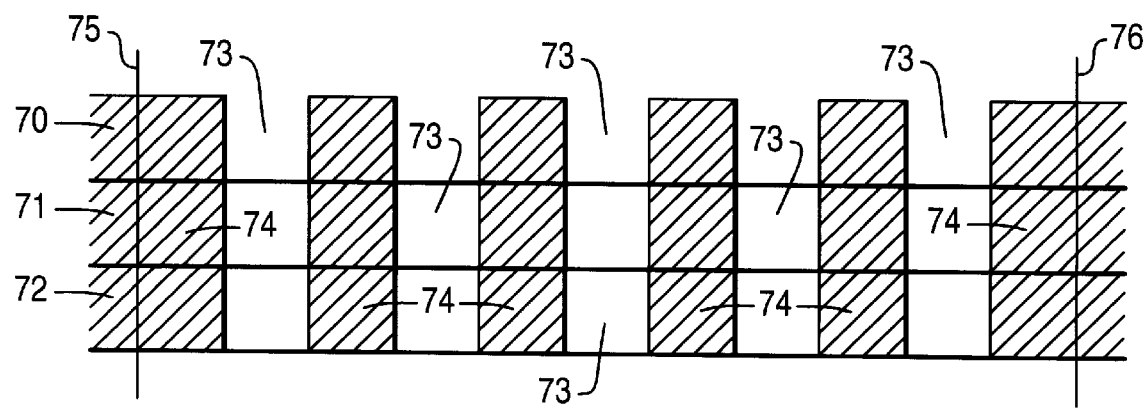
FIG. 7 is a sectional side view of a stacking arrangement for housing the cables.

As illustrated in FIG. 7 there is an embodiment where a stacking relationship of the cables can be effected. There is shown three elements 70, 71 and 72 in a parallel relationship stacked one above the other. Each of the elements has spaces 73 and teeth 74 which are stacked one above the other. In each of the respective spaces, there would be locations for the cables. At the ends of the elements 70, 71 and 72, there are securing rods or members 75 and 76 which can be elongated bars which fit through mating holes in each of the members. In this manner a stacked arrangement of cables can be provided in the system. Moreover, with the arrangement of the invention that is provided, a system where the routing and tracing of cables can easily be followed. Thus, there are systems where cables can always run in the second space from the left of a particular housing member and, if this is known, the cables can be traced from one housing member to the other simply by knowing that a cable is always in housing position number two. The teeth or openings do not need to face each other or be limited to pairs. They can be located under floor or overhead in arrangements which could be facing each other or offset from each other.

Many other forms of the invention exist, each differing from the other in matters of detail only. For instance, instead of a hinge member it is indicated that at both ends of the members, the device can have the securing configuration of items 35 and 36. This can permit the two components to be separated, if necessary. In some other case the closure does not have the spaces for the cables and instead is a flat closure for spaces in the body member. The two components can have different shapes and further do not necessarily have the same shape. The hinge can be formed as an integral part of the other member rather than being an add-on element. The invention should be determined solely by the following claims.

What is claimed is:

1. A device for securing multiple cables comprising:
    a body member having a series of teeth, there being a series of spaces between the teeth, and a mouth for each space through which a cable is locatable in the space;
    a closure member for each space thereby to provide a housing to secure the cables in the space, the cables being spaced apart by the teeth; and
    a hinge located at one end of the body member and closure member, the hinge being for opening and closing the closure member relative to the body member, and wherein said cable can pass through the mouth of a space of the body member when the closure member is open relative to the body member.

2. A device as claimed in claim 1 wherein the body is elongated and the teeth and spaces form a comb configuration.

3. A device as claimed in claim 2 wherein the comb configuration has a depth and wherein the width of the spaces is substantially equal to the depth of the comb configuration, the comb essentially having a rectangular front face with the spaces cut out along one edge of the face.

4. A device as claimed in claim 1 wherein the closure member comprises a body having a series of teeth, there being a series of spaces between the teeth and the closure member has a mouth for each space, and wherein the mouth for the spaces in the body member align with the respective mouth for the spaces in the closure member.

5. A device as claimed in claim 4 wherein the closure member is a comb configuration.

6. A device as claimed in claim 5 wherein cables fit in the spaces in the body and the spaces in the closure member.

7. A device as claimed in claim 1 wherein the closure member comprises a body having a series of teeth, there being a series of spaces between the teeth and the closure member has a mouth for each space, and wherein the mouth for the spaces in the body member are with the mouth for the spaces in the closure member.

8. A device as claimed in claim 7 wherein the closure member is a comb configuration.

9. A device as claimed in claim 7, wherein the respective mouth for the spaces in the body member are aligned with the teeth of the closure member.

10. A device as claimed in claim 1 further comprising a securing means at an end of the body and closure members opposite to the end having the hinge, the securing means acting to secure the closure member in a fixed relationship relative to the body member.

11. A device as claimed in claim 1 wherein the body and closure member are formed of plastic.

12. A device as claimed in claim 1 wherein the teeth are shaped to that the space has a mouth of relatively constricted area through which cables can pass and the space is of relatively greater width than the width of the mouth.

13. A device for securing multiple cables comprising:

a body member having a series of teeth, there being a series of spaces between the teeth, and a mouth for each space through which a cable is locatable in the space;

a closure member for each space thereby to provide a housing to secure the cables in the space, the cables being spaced apart by the teeth;

the closure member being a body having a series of teeth, there being a series of spaces between the teeth and the closure member having a mouth for each space, a hinge located at one end of the body member and closure member, the hinge being for opening and closing the closure member relative to the body member, wherein cable can pass through the mouth of a space of the body member when the closure member is open relative to the body member; and a securing means at the end of the members opposite to the end having the hinge, the securing means acting to secure the closure member in a fixed relationship relative to the body member.

\* \* \* \* \*

UNITED STATES PATENT AND TRADEMARK OFFICE
CERTIFICATE OF CORRECTION

PATENT NO. : 5,990,420
DATED      : November 23, 1999
INVENTOR(S) : Arthur Ray Alexander It is certified that error appears in the above-indentified patent and that said Letters Patent is hereby corrected as shown below:

Column 4, Line 34, after "comb" insert --configuration--

Column 4, Line 39, "mouth" should be -- mouths --.

Column 4 Line 41, "mouth" should be --mouths--.

Column 4, Line 49, "mouth" second occurrence, should be --mouths--.

Column 4, Line 50, after "are" insert --misaligned--, and after "the", second occurrence, delete "mouth" and insert --mouths--.

Column 4, Line 65, delete "to" and insert -- so --.

Column 4, Line 66, after "which" insert -- the --.

Column 6, Line 4, after "which: insert -- said --.

Column 6, Line 7, delete "the", first occurrence, and insert --an--. Before "members" insert --body and closure--

Signed and Sealed this

Twenty-seventh Day of March, 2001

Attest:

NICHOLAS P. GODICI

Attesting Officer    Acting Director of the United States Patent and Trademark Office